United States Patent
Shono et al.

(10) Patent No.: US 6,788,787 B1
(45) Date of Patent: Sep. 7, 2004

(54) PSEUDORANDOM NUMBER GENERATOR, STREAM ENCRYPTION METHOD, AND STREAM ENCRYPTING COMMUNICATION METHOD

(75) Inventors: Katsufusa Shono, Kanagawa-ken (JP); Osamu Ueno, Shizuoka-ken (JP); Tetsuya Ishihara, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/512,284

(22) Filed: Feb. 24, 2000

(30) Foreign Application Priority Data

Feb. 25, 1999 (JP) .......................................... 11-048957
Feb. 18, 2000 (JP) ....................................... 2000-040899

(51) Int. Cl.[7] .............................................. G06F 1/02
(52) U.S. Cl. ......................... 380/46; 380/263; 708/250; 708/251; 708/252
(58) Field of Search ................................ 708/250, 251; 380/46, 263

(56) References Cited

U.S. PATENT DOCUMENTS

| | | | | |
|---|---|---|---|---|
| 3,999,129 A | * | 12/1976 | Kasson | 375/243 |
| 4,398,062 A | * | 8/1983 | McRae et al. | 380/257 |
| 4,853,884 A | * | 8/1989 | Brown et al. | 708/3 |
| 4,905,176 A | * | 2/1990 | Schulz | 708/252 |
| 5,059,982 A | * | 10/1991 | Bacrania et al. | 341/172 |
| 5,295,188 A | * | 3/1994 | Wilson et al. | 380/30 |
| 5,923,760 A | * | 7/1999 | Abarbanel et al. | 380/34 |
| 6,195,669 B1 | * | 2/2001 | Onodera et al. | 708/3 |

* cited by examiner

Primary Examiner—Gregory Morse
Assistant Examiner—Jacob Lipman
(74) Attorney, Agent, or Firm—Finnegan, Henderson, Farabow, Garrett & Dunner, L.L.P.

(57) ABSTRACT

A chaos-generating loop includes a one dimensional mapping circuit (13) with non-linear input-output characteristics for generating chaos, a linear or non-linear AD converter (15) for converting an analog output of the one dimensional mapping circuit (13) to digital form, a sample-and-hold circuit (17) for holding and outputting the digitally converted value from the AD converter (15), in response to an external clock (C), and a linear or non-linear DA converter (19) for converting an output of the sample-and-hold circuit (17) to analog form and outputting this analog signal to the one dimensional mapping circuit (13), and a decoder for outputting a chaos stream in response to the output of the sample-and-hold circuit (17).

11 Claims, 6 Drawing Sheets

PSEUDORANDOM NUMBER GENERATOR, STREAM ENCRYPTION METHOD, AND STREAM ENCRYPTING COMMUNICATION METHOD

BACKGROUND OF THE INVENTION

1. Field of the Invention

The present invention relates to a pseudorandom number generator that generates a chaotic stream of pseudorandom numbers, to a method for stream encrypting, and to a stream encrypting communication method.

2. Description of the Related Art

With the widespread application of digital computers, networks connecting computers have exhibited rapid development, bringing with it the need to transfer huge quantities of information, and multi-user communication is expected to be able to meet this need.

The purpose of achieving widespread use of multi-user communication is to achieve reliable transfer of huge amounts of information and to reap the benefits of sharing single communication circuit. Beyond this purpose, however, there are also the aims of achieving a robust social infrastructure, preventing unauthorized access, and assuring confidentiality.

In next-generation multi-user communication systems, CDMA (code division multiple access) systems, making use of spectral diversity with good immunity to interference, will become the systems of choice. In such spread-spectrum systems, pseudorandom number generators will be key devices. Because noise generated by actual physical mechanisms lacks repeatability, it is not usable as a practical technology in industry. In its place, there is a need for pseudorandom number generators capable of generating diverse and repeatable binary streams that can be treated as pseudorandom numbers.

The term pseudorandom noise is used interchangeably with the term pseudorandom number. Because true pseudorandom numbers, for example, as would be generated by tossing a coin, are not repeatable, they are not applicable to industrial technologies. On the other hand, unless a series of numbers can defy prediction, it cannot not be expected to offer sufficient scrambling or dispersion. Thus, the needs of industry require that these conflicting goals be met in developing an ideal pseudorandom number generator.

In the past, an M series generated by feedback shift register circuits has been known for use as pseudorandom number generators. Because if the period of an M series is made long, it is possible to achieve a time sequence that is not much different from a true series of random numbers, these are often used in place of true random numbers.

In order to achieve sufficient communication security, it is necessary to assure that the content being communicated be invisible. For this reason, it is desirable that a pseudorandom number series be used that has a low auto-correlation and cross-correlation function. With feedback shift register circuit as used in the past, however, it was difficult to generate a large number of periodic sequences with a low auto-correlation and cross-correlation function.

A chaotic stream is known to include all frequency components, and is extremely close to representing random numbers. For this reason, it is known that, if it is possible to make a chaotic stream periodic, it could be used as pseudorandom numbers.

However, because a chaotic stream repeats diversion and conversion in an unpredictable manner, it is not usable as is, and requires the addition of a means for control of the chaotic stream.

SUMMARY OF THE INVENTION

Accordingly, it is an object of the present invention, in view of the above-described background, to provide a pseudorandom number based on a chaotic stream that includes all frequency components, which uses a novel concept of non-linear quantizing, in which decimal parts are discarded so as to achieve integer scaling. The result being control of the chaotic stream so as to achieve generation of a large number of types of time series with low auto-correlation and cross-correlation functions, Another object of the present invention is to provide a method for stream encrypting, which uses a binary stream obtained from a pseudorandom number generator to generate, for use, for example, in communication, encrypted text that achieves an optimal high level of security.

It is yet another object of the present invention to provide a stream encrypting communication method using an encrypted text code obtained from a stream encrypting method that enables stream encrypted communication with an extremely high level of security.

To achieve the above-noted objects, a first aspect of the present invention includes a one dimensional mapping circuit for generating chaos having non-linear input-output characteristics, an AD converter for converting an analog output of the one dimensional mapping circuit, a sample-and-hold circuit for holding and outputting a digitally converted value from the AD converter in response to an external clock, and a DA converter for outputting an analog converted value in response to the output of the sample-and-hold circuit as feedback to the one dimensional mapping circuit, (forming a chaos-generating loop), wherein the quantizing divisions of at least one of the AD converter and the DA converter are made non-linear, and a binary sequence is output responsive to the output of the sample-and-hold circuit.

According to this aspect of the present invention, with the one dimensional mapping circuit (with non-linear input-output characteristics) forming a chaos-generating loop via a sample-and-hold circuit and the like, a mapping function whereby chaos is generated is provided. By using the AD converter or the DA converter (hereinafter collectively referred to as the non-linear quantizer), the input-output characteristics of this one dimensional mapping circuit having self-feedback (the mapping at each step is suppressed), a periodic time series may be obtained from the generated chaos. The output of the sample-and-hold circuit is applied, for example, to a general decoder, and a binary sequence {Y(t)–t} is extracted from the decoder output, where t is the discrete time.

If the chaos contains all frequency components, and non-linear quantizing is used to observe its internal condition, the chaos is converted to a multiple-value integer sequence, which encompasses all combinations of integer sequences. By including a non-linear quantizer within the chaos-generating loop, it is possible to simultaneously extract the period and random numbers, and it is intrinsically guaranteed to be possible to extract all combinations thereof.

A second aspect of the present invention is a variation of the first aspect, wherein the pseudorandom number generator has an AD converter with linear quantizing divisions and a DA converter with non-linear quantizing divisions.

According to the second aspect of the present invention, by using an AD convener with linear quantizing divisions and DA converter with non-linear quantizing divisions, it is possible to broaden the dynamic range of the one dimensional mapping circuit.

A third aspect of the present invention is a variation on the pseudorandom number generator of the first aspect, wherein the one dimensional mapping circuit is implemented by a CMOS inverter, and wherein the AD converter is configured so as to include an AD weighting resistive array and a comparator array that compares the relative size of an output obtained from a synthesized resistance of the AD weighting resistive array and the analog output from the one dimensional mapping circuit. The sample-and-hold circuit is implemented as a flip-flop array that captures and holds the digital output of the AD converter in response to an external clock, and wherein the DA converter is configured so as to include a DA weighting resistive array. Further, a switching array outputs an output obtained from the synthesized resistance of the DA weighting resistive array in response to the digital output from the sample-and-hold circuit as feedback to the one dimensional mapping circuit.

According to the third aspect as described above, it is possible to implement the pseudorandom number generator using a CMOS integrated circuit.

A fourth aspect of the present invention is a variation on the pseudorandom number generator of the third aspect, wherein an exclusive-OR array is inserted which takes the exclusive-OR of the outputs of each comparator making up the comparator array. The exclusive-OR array is provided between the AD converter and the sample-and-hold circuit.

The above-noted aspects of the present invention are described as pseudorandom number generators having a chaos-generating loop that includes one one dimensional mapping circuit. In contrast to these, there are other aspects of the present invention which are pseudorandom number generators having a chaos-generating loop that includes a pair of one dimensional mapping circuits.

More specifically, a fifth aspect of the present invention has a chaos-generating loop that includes a pair of one dimensional mapping circuits for generating chaos having non-linear input-output characteristics, a pair of CMOS switches which alternately open and close an output side path of the one dimensional mapping circuits, in synchronization with an external clock, and a pair of feedback loops that cross-connect the analog outputs of each of the one dimensional mapping circuits, via the CMOS switches, as feedback to the inputs of the other of the one dimensional mapping circuits, and a pair of AD converters that perform digital conversion of the analog outputs of the one dimensional mapping circuits that are extracted via the CMOS switches. In the chaos-generating loop, according to the elapse of the discrete time established by an external clock, the outputs of the one dimensional mapping circuits are alternately mapped, so as to output, via each of the AD converters, a binary sequence that is a chaos sequence.

In the pseudorandom number generator of the fifth aspect as described above, the binary stream extracted by the alternating method noted above is a random arrangement of data comprised of mixed 0 and 1 values. By obtaining a binary stream arranged as a combined time series from these binary data streams, it is possible to generate pseudorandom numbers in a chaos stream.

If the world is viewed from the standpoint of chaos, the same event never occurs twice. In terms of the individual input-output characteristics of the individual one dimensional mapping circuits, it is considerably difficult to maintain total symmetry. Additionally, it is quite difficult to maintain total coincidence in the correlation of input-output characteristics of each of the pair of one dimensional mapping circuits, and it is additionally true that there is no assurance that the two AD converters perform identical quantizing. In removing such causes for uncertainty the present invention is extremely effective in providing a hardware implementation of a mass-producible pseudorandom number generator on a single integrated circuit.

According to the fifth aspect of the present invention as described above, because repeated alternate mapping is performed by the pair of one dimensional mapping circuits, and the analog outputs obtained by mapping in this manner are fed back by cross-connection, the binary stream obtained exhibits a fine disturbance of 1 and 0 values, acting in combination with divergence and convergence of the analog outputs created by the pair of one dimensional mapping circuits and the initial value sensitivity characteristic of chaos. It is expected that the characteristic variation properties of chaos will contribute to the improvement of the robustness of stream encrypting.

In a pseudorandom number generator configured as described above, if a long time series is to be generated, this can be done by repeating mapping in the chaos-generating loop. If it is assumed that a time series of a PN signal will be extracted as a time series of a prescribed length from a long time series generated in this manner, it is necessary that the auto-correlation and cross-correlation functions of the extracted time series be sufficiently small. That is, it is required that there be no overlaps in the correlation if the phase is shifted one bit at a time. This is to assure the robustness of the code.

Furthermore, there is a need, not only for a large number of types of extracted time series, but for the ability to reliably generate long time series that are different from one another, by changing the initial value, even starting from one one dimensional mapping circuit. In chaos generation, the initial value is given as a real number, and because there is an infinity of real numbers this cannot be applied to industrial technology. This being the case, in a sixth aspect of the present invention, an applied voltage corresponding to a real number is applied, via a DA converter.

Specifically, the sixth aspect of the present invention is a variation of the pseudorandom number generator of the fifth aspect, which further has a DA converter that performs an analog conversion of an initial value given in the form of a digital signal, and a CMOS switch, which performs opening and closing of an output side path of the DA converter, synchronized to an external clock.

In the above-noted sixth aspect of the present invention, an applied voltage is given via a DA converter, which corresponds to a real number. By increasing the quantizing resolution of the DA converter, the increase in the number of initial value types enables an increase in the number of extractable time series. This is an extremely important element in maintaining sensitivity with respect to initial value in the practical application of chaos to industry.

According to the sixth aspect of the present invention, because initial value sensitivity is given via a DA converter, using a pair of binary streams that differ in their staring points, regardless of how these streams are phase shifted and overlapped, there is no coincidence therebetween, and it is possible to achieve a time series with a sufficiently low auto-correlation and cross-correlation function.

It is desirable that the design be such that the input-output characteristics of the one dimensional mapping circuits that are used as elements in the pseudorandom number generator can be adjusted from outside.

From the above-noted standpoint, a seventh aspect of the present invention is a variation of the pseudorandom number generator of the fifth aspect, designed so that at least one of the pair of one dimensional mapping circuits has input-output characteristics that can be individually adjusted by means of an external adjustment voltage. By doing this, because the input-output characteristics of the one dimensional mapping circuit are externally adjustable, it is possible to further increase the number of extractable chaotic streams.

An eighth aspect of the present invention is a method for stream encrypting, whereby a binary stream generated by a pseudorandom number generator according to the first or fifth aspect of the present invention is used to perform stream encrypting, thereby obtaining an encrypted text code, whereby the above-noted stream encrypting is achieved by an exclusive-OR operation performed between a binary stream obtained from the pseudorandom number generator and the plain text to be encrypted.

According to the eighth aspect of the present invention, the encrypted text is generated by performing stream encrypting using a binary stream obtained from a pseudorandom number generator. Further, according to the present invention, because the stream encrypting is done by an exclusive-OR operation between the binary stream and the plain text to be encrypted, it is possible to achieve a stream encrypting method capable of producing encrypted text with an extremely high degree of security for applications such as communications.

A ninth aspect of the present invention is a stream encrypting communications method that uses an encrypted text obtained by the stream encrypting method of the eighth aspect of the present invention.

According to the ninth aspect of the present invention, because stream encrypted communication is performed using an encrypted text obtained by the stream encrypting method of the present invention, it is possible to perform stream encrypted communication with an extremely high degree of security. More specifically, it is possible to implement an asynchronous multiple user stream encrypted communication system in which a user, possessing the same pseudorandom number generator as was used in encrypting, can achieve synchronous playback, expansion, mixing, and transfer of the encrypted text.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
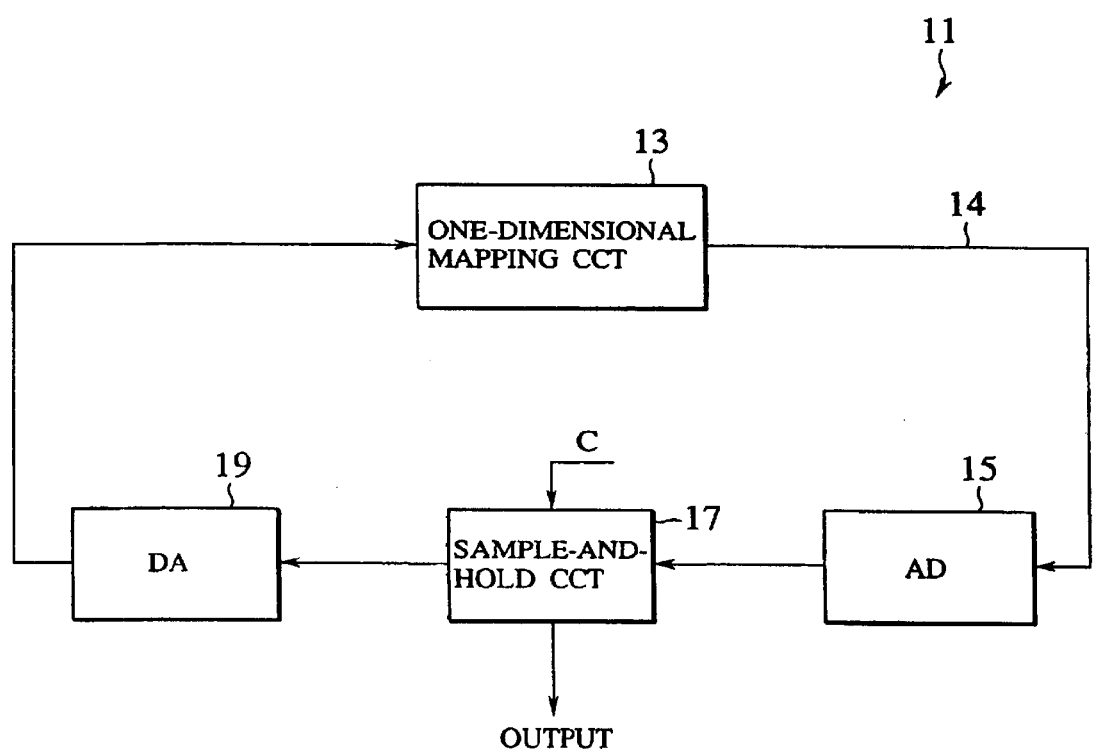
FIG. 1 is a simplified block diagram showing a pseudorandom number generator according to the present invention.

Embodiments of the present invention are described in detail below, with reference made to relevant accompanying drawings. In the accompanying drawings, corresponding elements have been assigned the same reference numerals.

FIG. 1 is a simplified block diagram of a pseudorandom number generator according to a first embodiment of the present invention.

As shown in FIG. 1, the pseudorandom number generator 11 of the first embodiment, which corresponds to the first aspect of the present invention has a one dimensional mapping circuit 13 for generating chaos having non-linear input-output characteristics, an AD converter 15 for digitally converting an analog output of the one dimensional mapping circuit 13, a sample-and-hold circuit 17 for holding and outputting the digitally converted value of the AD converter 15 in response to an external clock C, and a DA converter 19 for outputting to the one dimensional mapping circuit 13 an analog converted value in response to the output of the sample-and-hold circuit 17. The aforementioned elements form a chaos-generating loop 14, wherein an output of the sample-and-hold circuit 17 is given to a general-purpose encoder, and a binary stream {Y(t)t} (where t is the discrete time) is extracted from an output of the decoder. In this embodiment, at least one of the AD converter 15 and the DA converter 19 has non-linear quantizing divisions.

The constituent elements noted above are related to the constituent elements of the present invention as recited in claim 1 of the accompanying claims as follows. Specifically, the one dimensional mapping circuit 13 corresponds to the one dimensional mapping circuit of the claim, the AD converter 15 corresponds to the AD converter of the claim, the sample-and-hold circuit 17 corresponds to the sample-and-hold circuit of the claim, and the DA converter 19 corresponds to the DA convener of the claim.

Referring to FIG. 1, the operation of the pseudorandom number generator 11 of the first embodiment is as follows. In an integer time series {y(t)−t} observed internally in chaos generated by non-linear quantizing, there is a complex intermingling of divergence, convergence, and bifurcation. By inserting a non-linear quantizer (AD or DA converter) in the chaos-generating loop, chaos is suppressed, thereby resulting in an integer time series that is made periodic. In this embodiment, this integer time series signal is output as the binary stream {Y(t)−t}, with series of pseudorandom numbers in a chaos stream.

A chaos stream has an auto-correlation that is midway between that of an M series and a GOLD series, has better noise immunity than the other series, enables generation and decoding to be done with software, and also has the characteristics of multi-value noise system (which uses a white noise generating circuit). In addition, the ability to identify the dispersion key facilitates decoding.

The sequence of a closed integer series when the weighting of AD and DA converters and the connectivity therebetween are both fixed is given as one type of time series. Changing the time series sequence is achieved by changing the connectivity between the AD and DA convertors.

In the case of a 4-bit quantizing resolution, there are 16! to $2.09 \times 10^{13}$ types of possible combinations, of which not all, of course, are valid as dispersion signals. Appropriate combinations are selected by examining the auto-correlation and cross-correlation functions.

Figure 2:
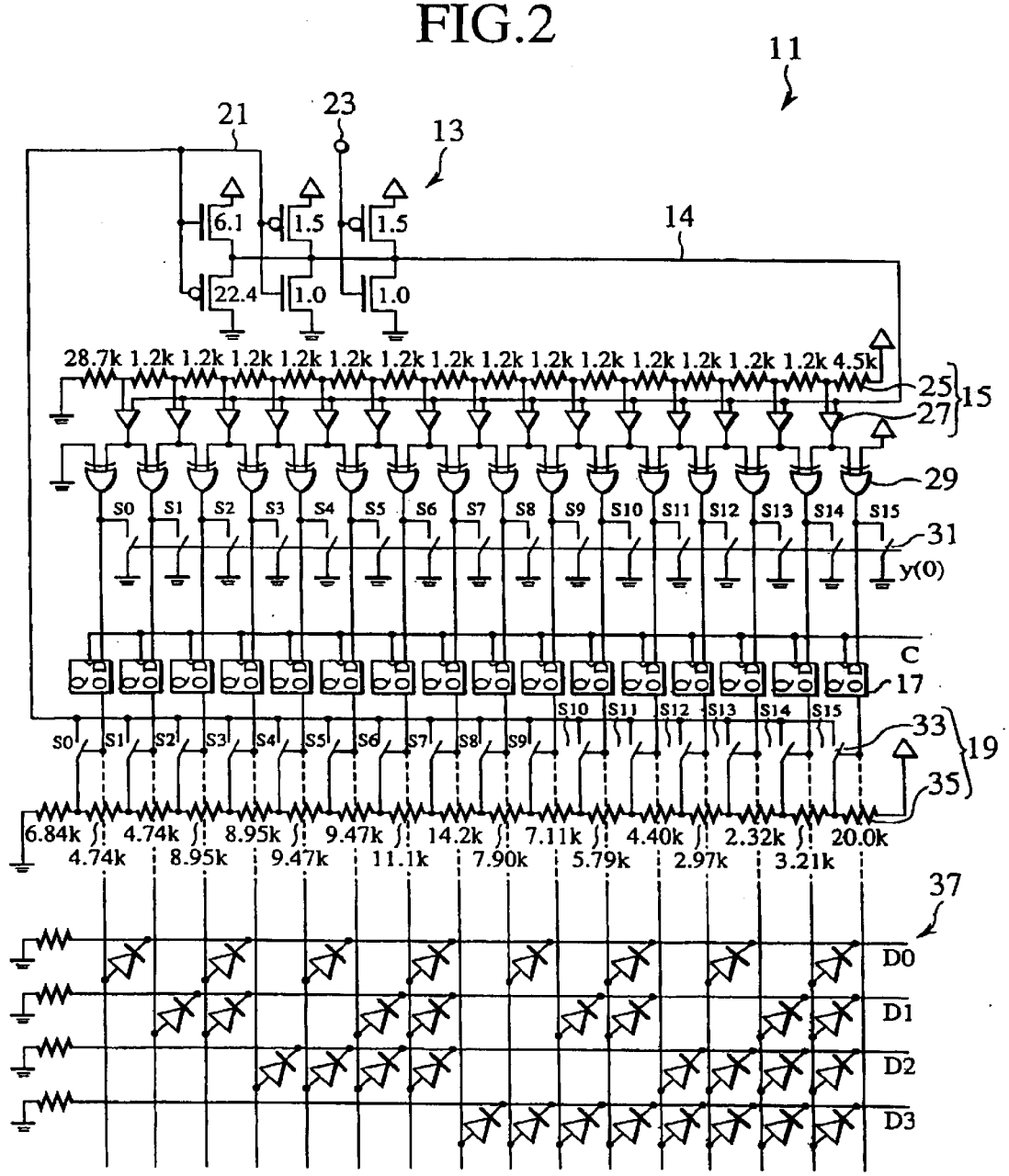
FIG. 2 is a circuit diagram showing an implementation of a pseudorandom number generator of the present invention.

FIG. 2 shows the circuit of the pseudorandom number generator 11 of the first embodiment of the present invention, as recited in claim 1 through claim 4 of the accompanying claims.

In FIG. 2, a first pseudorandom number generator 11 includes a one dimensional mapping circuit 13 comprising three stages of CMOS inverters, an AD weighting resistive array 25, a comparator array 27, an exclusive-OR array (hereinafter referred to as an EXOR array) 29, a switch array 31 that gives an initial value, a D-type flip-flop array 17 that serves as a sample-and-hold circuit, a DA switch array 33, a DA weighting resistive array 35, and a decoder 37.

Because the one dimensional mapping circuit 13 is described in detail in the Japanese Laid-open Patent Application publication 9-260952 of one of the inventors which has already been made public, it will only be described simply herein. Specifically, the first stage is a source follower which establishes an increasing function with respect to the input. The second and third stages are inverters, which establish decreasing functions with respect to their inputs. The third stage inverter input 23 is provided for adjusting the non-linearity of the non-linear mapping function. The numbers affixed to the PMOS and NMOS transistors are the weights applied to the channel conductances. The state decisions of the output with respect to the input must be performed at a high speed (up to a Megahertz) and also with high precision (up to the quantizing resolution).

The AD weighting resistive array 25 is an array of resistors of uniform resistances of, for example, 1.2 kΣ. That is, this embodiment shows that the AD converter is designed so as to have linear quantizing divisions. The resistors on the ends (having resistance values of 4.5 kΣ and 28.7 kΣ) are bias resistances provided for the purpose of making the dynamic range of the output of the input-output characteristics of the one dimensional mapping circuit 13 coincide with the operating region of the AD converter 15.

The comparator array 27 performs a comparison between the quantizing reference voltage established by the synthesized resistance of the AD weighting resistive array 25 and the voltage output to the chaos-generating loop 14 by the one dimensional mapping circuit 13, and outputs a Gray code. That is, the AD weighting resistive array 25 and the comparator array 27 operate collectively as an AD converter 15.

The EXOR array 29 in the example shown in the drawing takes the exclusive-OR of the output bits from neighboring comparators of the comparator array 27, outputting a 1 level for bits which do not coincide in the Gray code, and a 0 level for coinciding bits.

In the switch array 31, which establishes the initial value, the switch S5, which establishes the initial value y(0), is the only switch connected to the power supply voltage, with the all other switches being grounded. Additionally, there is a reset/startup button.

The D-type flip-flop array 17, which serves as a sample-and-hold circuit, captures the outputs of the EXOR array 29, in synchronization with the timing of an external clock, which are held and output to the DA switch array 33 and decoder 37. By doing this, the D-type flip-flop array 17 controls the signal output timing of the pseudorandom number generator 11.

The DA switch array 33 operates so that only the switches for which the output of the flip-flop array 17 (this being the output of the EXOR array 29) is at the 1 level are closed.

The DA weighting resistive array 35 has resistance values that establish non-linear weighting. In the DA switch array 33, therefore, if a switch for which the output of the flip-flop array 17 (this being the output of the EXOR array 29) is at the 1 level, is closed, a non-linear voltage is generated in the DA weighting resistive array 35, and an input is applied to the one dimensional mapping circuit 13 via the feedback path 21 of the chaos-generating loop. Thus, the DA switch array 33 and the DA weighting resistive array 35 operate collectively as a DA converter 19.

The dynamic ranges of the AD converter 15 and the DA converter 19 are adjusted so as to coincide, respectively, with the x-axis (input) and y-axis (output) of the input-output characteristics of the one dimensional mapping circuit 13.

The decoder 37 is formed by a diode matrix arranged so as to represent a truth table, whereby 4-bit digital codes are output that are responsive to outputs of the flip-flop array (that is, EXOR array 29) that are at the 1 level. In the first embodiment, the timing circuit for obtaining a binary stream $\{Y(t)\,(\overline{D_0}, D1, D2, D3)\text{-}t\}$ is omitted from the drawing.

This embodiment of the present invention is a specific example, in which the quantizing resolution is 4 bits, and the binary stream Y(t) has a period of 64 bits.

The auto-correlation function used in the above-noted first embodiment is as follows.

$$R(\tau) = \sum_{t=0}^{63} Y(t)Y(t+\tau)$$

Figure 3:
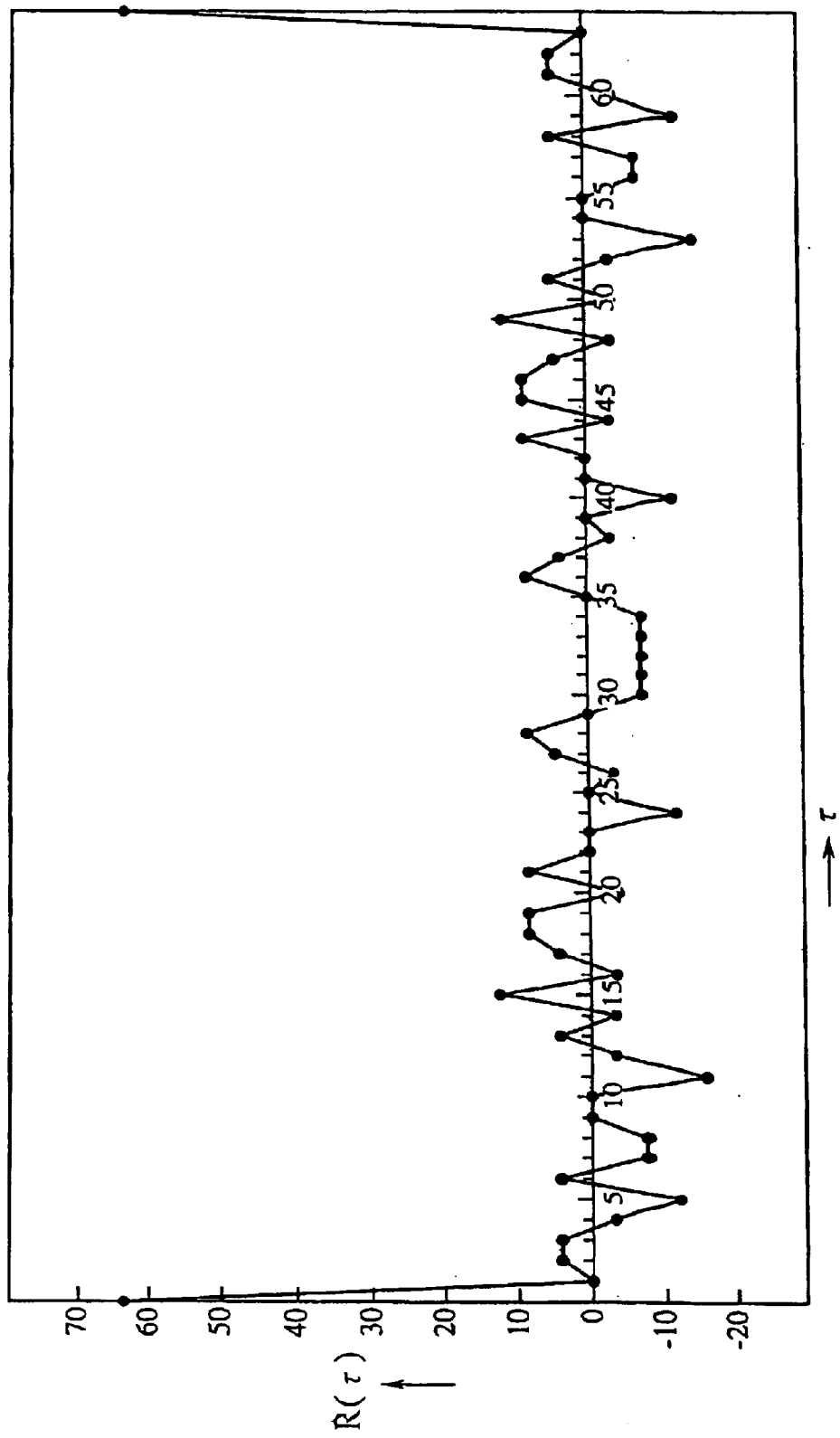
FIG. 3 is a distribution of an auto-correlation function.

One example of this is shown in FIG. 3, which shows the result of performing the calculation after replacing bit 1 with +1 and bit 0 with −1 in the binary stream $\{Y(t)\,(D_0, D_1, D_2, D_3)\text{-}t\}$, from which it can be seen that complete synchronization is achieved at delay times υ of 0 and 64. While there are peaks of approximately ¼ at side lobes and it appears at first glance that the correlation is poor, this function is one which theoretically facilitates the establishment of synchronization.

To change the type of the binary stream $\{Y(t)\text{-}t\}$, the connection relationship between the AD converter and the DA converter is changed. By doing this, it is in principle possible to extract 16! to 2.09 ×1013 different types of the binary stream $\{Y(t)\text{-}t\}$. Because not all of these are guaranteed to be time series with a low auto-correlation function, it is necessary to examine not only sequence, but the distribution of the auto-correlation function as shown in FIG. 3.

Because the auto-correlation function is dependent on the sequence of extraction of the decoder outputs (D0, D1, D2, and D3), this can be employed to change the type of series.

If a multi-user establishes the binary series Y(t) and implements a system in which two types of series, $\{Y_A(t), Y_B(t)\}$ are used, it is necessary to guarantee beforehand that the correlation is low in the distribution of the cross-correlation function given below.

$$R(\tau) = \sum_{t=0}^{63} Y_A(t)Y_B(t+\tau)$$

While the first embodiment of the present invention is for the example in which the quantizing resolution is n=4 and the period of the binary stream is 64 bits, considering the state decision accuracy of the one dimensional mapping circuit, it is easy to implement systems up to one in which the resolution is n=8 and the binary stream period is 2048 bits.

It has been verified by a bread-boarded implementation of a system with a quantizing resolution of n=4 and a binary stream period of 64 bits that stable operation is possible up to a clock frequency of 20 kHz. Additionally, while the first embodiment is one in which the CMOS source follower is implemented by an enhancement mode MOS transistor, in executing a one-chip IC implementation, the use of a depletion mode MOS transistor as the CMOS source follower enables an increase of the clock frequency to the megahertz order.

The above-described first embodiment was described for the case of a pseudorandom number generator having a chaos-generating loop that includes one one dimensional mapping circuit. In contrast to this, a second embodiment of the present invention, which is a pseudorandom number generator having a chaos-generating loop with a pair of chaos-generating loops is described below.

Figure 4:
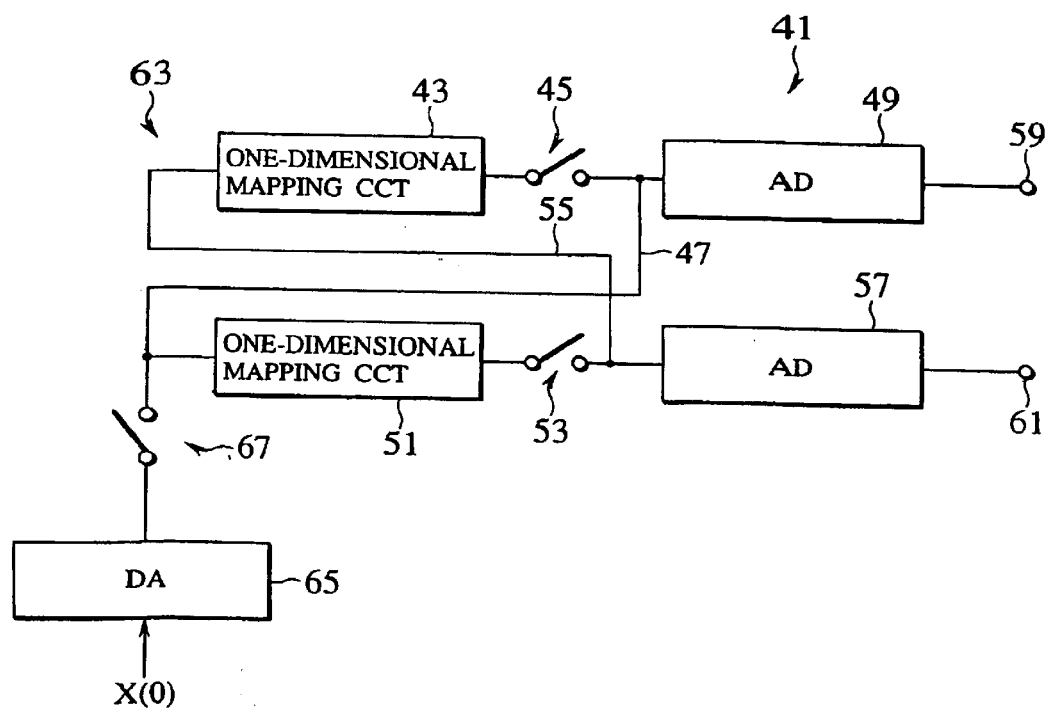
FIG. 4 is a simplified block diagram showing a pseudorandom number generator according to a second embodiment of the present invention.

FIG. 4 is a simplified block diagram of a pseudorandom number generator according to the second embodiment of the present invention.

The pseudorandom number generator 41 shown in FIG. 4 has a chaos-generating loop 63 that includes a pair of one-input/one-output one dimensional mapping circuits 43 and 51 for generating chaos having non-linear input-output characteristics, a pair of CMOS switches 45 and 53 for opening and closing the output-side paths in the pair of one dimensional mapping circuits 43 and 51, in synchronization with an external clock, a pair of feedback loops 47 and 55 that cross-connect the analog outputs of each of the pair of one dimensional mapping circuits 43 and 51, via the CMOS switches 45 and 53, to the input sides of the one dimensional mapping circuits 43 and 51, a pair of AD converters 49 and 57 for performing digital conversion of the analog outputs of the pair of one dimensional mapping circuits 43 and 51 that are extracted via the CMOS switches 45 and 53, a DA converter 65 that converts to analog form the initial value x(0) given in digital signal form, and a CMOS switch 67 that opens and closes the output-side path of the DA converter 65 in synchronization with an external clock. In the pseudorandom number generator 41 configured in this manner, according to the elapse of the discrete time t(0, 1, 2, . . . ) established by an external clock in the chaos-generating loop 63, each of the pair of one dimensional mapping circuits 49 and 57 performs alternate mapping, thereby outputting, via each of the AD converters 49 and 57, a binary series that is a chaos stream.

Figure 5:
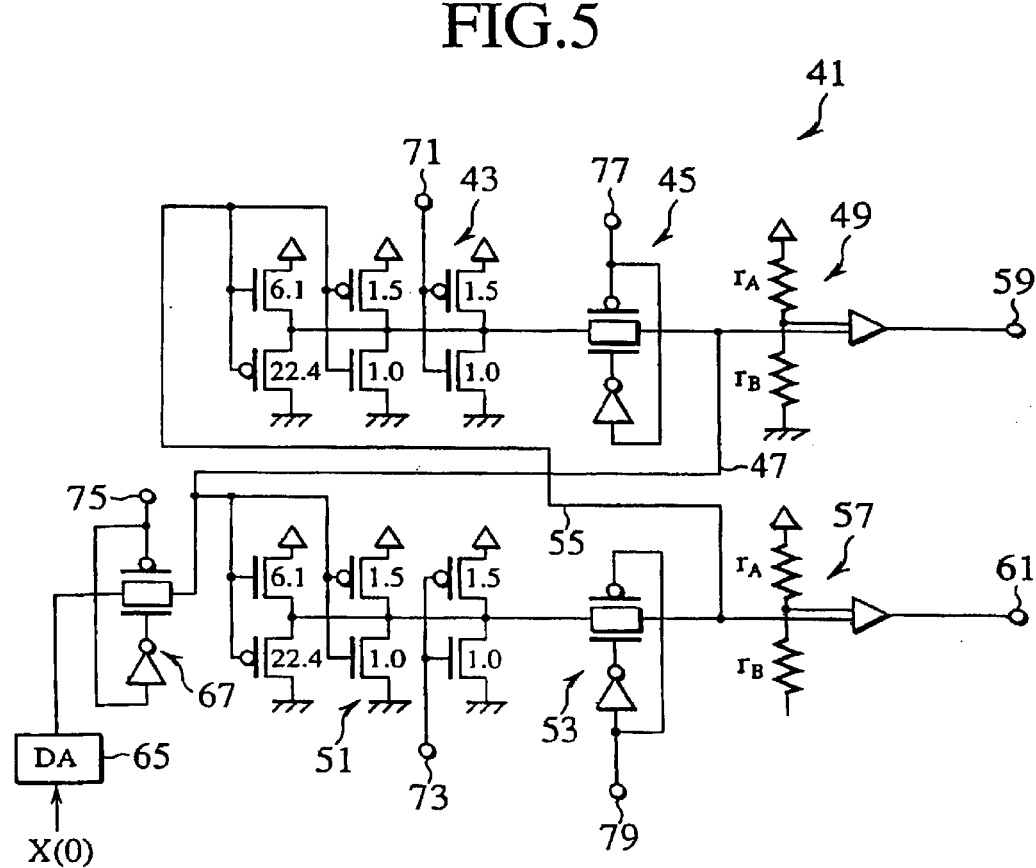
FIG. 5 is a circuit diagram showing an integrated circuit implementation of the pseudorandom number generator 41 of FIG. 4.

An integrated circuit implementation of the second pseudorandom number generator 41 shown in FIG. 4 is shown in FIG. 5. FIG. 4 and FIG. 5 are depicted so that the correspondence therebetween can be seen, with corresponding elements assigned the same reference numerals in both drawings. Referring to FIG. 5, the internal configuration of each of the blocks of the second pseudorandom number generator 41 is described below.

Each of the pair of one dimensional mapping circuits 43 and 51, which has substantially N-shaped input-output characteristics, comprises 6 MOS transistors. In FIG. 5, the width and length dimensions of the channel of each transistor are indicated numerically as weights. The first stage CMOS inverter establishes an increasing function, while the second-stage CMOS inverter establishes a decreasing function. By taking the inputs and the outputs of the two CMOS inverters in common so as to combine the functions, the result is the substantially N-shape input-output characteristics shown in FIG. 6, for example.

The third-stage CMOS inverter receives the external adjustment voltages applied to the input terminals 71 and 73, and modifies the input-output characteristics of the one dimensional mapping circuits 43 and 51. The values of the external adjustment voltages applied to the input terminals 71 and 73 can be either one and the same value of voltage or different voltage values. Additionally, it is possible to omit one of the external adjustment voltages applied to the input terminals 71 and 73.

The external adjustment voltages applied to the input terminals 71 and 73 can be derived as analog voltages that are obtained by conversion of a digital code that is set by a computer beforehand by a DA converter to analog form, in which case the values of the external adjustment voltages change in stepwise fashion, according to the quantizing resolution of the DA converter.

The CMOS switches 45, 53, and 67 are formed by the combination of a transfer gate, made by connecting a PMOS transistor and an NMOS transistor in parallel, with a CMOS inverter. The CMOS switches are opened and closed in response to control signals applied to input terminals 75, 77, and 79.

A reset pulse that gives the initial value is applied to the input terminal 75, and the initial value x(0) is given via the DA converter 65. That is, the initial value x(0) of the internal loop state at the discrete time t=0 is given to (via the CMOS switch 67) the one dimensional mapping circuit 51 through the DA converter 65. For example, in a system using a DA converter 65 having a quantizing resolution of 12 bits, there are $2^{12}$=4096 different initial values x(0) that can be given.

The external clocks (discrete time t) applied to the input terminals 77 and 79 are non-overlapping squarewaves. The maximum clock frequency under this condition governs the processing speed of this pseudorandom number generator. This processing speed is established by the internal state decision speed of the one dimensional mapping circuit. Upon building a breadboard circuit on a printed circuit board using discrete components, it was possible to raise the clock frequency as high as 20 kHz. The mapping circuit used in this embodiment is intended to be implemented as a one-chip integrated circuit, using standard CMOS IC technology, and when a prototype assuming a minimum feature size of 0.8 $\mu$m was made, it was verified by testing that operation is possible using a 1-MHz clock frequency.

The 1 bit output AD converters 49 and 57 receive as input the outputs of the one dimensional mapping circuits 43 and 51 via the CMOS switches 45 and 53, which alternately open and close in synchronization with an external clock, outputting respective binary streams responsive to the input levels. More specifically, the AD converters 49 and 57 use a comparator to make a comparison between a reference voltage obtained by the voltage division by a pair of resistances $r_A$ and $r_B$ and the output voltages of the one dimensional mapping circuits 43 and 51, converting the relative size comparison between the two signals to a 0 or 1 signal. Binary code time series data is alternately output from output terminals 59 and 61 in accordance with the progression of the external clock (discrete time t). The binary code time series data extracted in this manner is data made up of randomly interspersed values of 0 and 1 and, when the input-output characteristics of the one dimensional mapping circuits 43 and 51 exhibit good symmetry, the frequency of occurrence of 0 and 1 is substantially the same. Under these conditions, the frequency of occurrence of an isolated 0 or 1 is twice the frequency of occurrence of a duplicated series of 00 or 11. By obtaining a binary stream arranged as a combined time series from the binary coded time series alternately extracted from the output terminals 59 and 61, it is possible to generate pseudorandom numbers in a chaos stream.

If the world is viewed from the standpoint of chaos, the same event never occurs twice. In terms of the individual input-output characteristics one of the one dimensional mapping circuits, it is quite difficult to maintain total symmetry. Additionally, it is quite difficult to maintain total coincidence in the correlation of the input-output characteristics of the individual one dimensional mapping circuits 43 and 51. Furthermore, there is also no assurance that the two AD converters 49 and 57 will perform identical quantizing. In removing such causes for uncertainty the present invention is extremely effective in providing a hardware implementation of a mass-producible pseudorandom number generator on a single integrated circuit.

In the practical application of chaos technology to industry, it is extremely important to maintain sensitivity with respect to initial values. In the present invention, the initial value sensitivity is established by the DA converter 65. That is, between a pair of binary coded time series outputs 59 and 61 that have mutually different starting points, regardless of how the phase of these outputs is changed and the outputs overlapped, there is no coincidence therebetween, and the time series obtained have sufficiently low auto-correlation and cross-correlation functions.

Take the case in which the binary coded time series, arranged as a time series of values alternately extracted from the output terminals 59 and 61, is Y(t). Exemplary periodic series that may be extracted from this series as the signal PN, in the case of a binary time series PN signal with a period of 64 bits are Y(0) to Y(64), Y(64) to Y(127), and so on. If the internal chaos state is observed up to $t=s^{16}=65536$, it is possible to obtain 1024 different binary time series PN signals having a period of 64 bits. If the quantizing resolution of the DA converter 65 that establishes the initial value is 12 bits, it is possible to obtain $2^{12}=4096$ initial values, for which the number of types of PN signal would be as much as 4,194,304.

However, there is no assurance that all of the extracted PN signals will be usable independently. The unpredictability of the chaos code stream such as the PN signal is greatly dependent upon the individual input-output characteristics of the one dimensional mapping circuits, and on parameters such as the given initial value. Thus, for the extracted PN signals, it is necessary to examine the auto-correlation function and cross-correlation function when the phase is changed, so as to verify that the correlation other than the period is sufficiently low.

In the second pseudorandom number generator 41 described above, the symmetry of the individual input-output characteristics of the one dimensional mapping circuits 43 and 51 directly influences the output distribution of 0 and 1 values in the binary time series extracted from the output terminals 59 and 61. In general, for an ideal pseudorandom number, the output distribution ratio of 0 and 1 will be equal. If the second pseudorandom number generator 41 is to be operated in this manner, it is not only necessary to make the one dimensional mapping circuits 43 and 51 have the same input-output characteristics, but also to design the one dimensional mapping circuits 43 and 51 with the maintenance of good symmetry in mind.

However, in the practical industrial application of a pseudorandom number generator, there is not necessarily a need to have the same distribution ratio for 0s and 1s. This is because, so long as the required condition that the auto-correlation function and cross-correlation function when the phase is shifted be sufficiently small is satisfied, even if there is unevenness in the output distribution of 0s and 1s in the encrypted stream, no problem arises with regard to security of the code. In particular for the case in which the design actually was such that it destroyed the symmetry, if an attempt to decode the encrypted stream is made by a third person (assuming the maintenance of symmetry), the attempt to decode will inevitably fail, so that this can actually be considered to be an improvement in the robustness of the code system.

It is not necessary to make the individual input-output characteristics of the one dimensional mapping circuits 43 and 51 equivalent. On the contrary, implementation is possible by purposely causing the weights given to each of the transistors that make up the one dimensional mapping circuits different. Even if the one dimensional mapping circuits 43 and 51 are designed so as to have equivalent input-output characteristics, by independently applying external adjustment voltages with differing phases to the one dimensional mapping circuits 43 and 51, it is possible to destroy the equivalence of input-output characteristics of the one dimensional mapping circuits 43 and 51. Additionally, it is possible to devise a design so as to combine mutually distorted input-output characteristics for the purpose of broadening the dynamic range of the mapping.

The second pseudorandom number generator 41, as described above, can be implemented as a one-chip integrated circuit pseudorandom number generator of sufficiently small size, without including the DA converter and clock generator on the IC chip, as shown in FIG. 5. In contrast to the analog circuit chaos-generating loop 63, which includes the pair of one dimensional mapping circuits 43 and 51, which are the central parts of the pseudorandom number generator 41, because the DA converter and clock generator are digital circuits, it is also easy to include all of these in a one-chip integrated circuit.

While the design of a CMOS integrated circuit is generally implemented with enhancement mode elements, it is desirable that the first stage CMOS source follower of the one dimensional mapping circuits 43 and 51 included in the second pseudorandom number generator 41 be designed using depletion mode elements. By doing this, it is possible to design the weighting of the MOS transistors to be smaller, thereby enabling a balance mask design for the one dimensional mapping circuits.

Parameters such as the symmetry of the input-output characteristics of the one dimensional mapping circuits 43 and 51 and a parameter that establishes whether or not the input-output characteristics of the one dimensional mapping circuits 43 and 51 are to coincide, along with the initial value sensitivity that is characteristics of chaos, impart fine disturbances to the occurrence balance in the binary time series of 0 and 1 values that is obtained. These characteristic variations of chaos attributed to such parameters contribute to the robustness of the chaos code stream.

An example of applying the second pseudorandom number generator 41 to a stream encrypted communication system is described below, with reference being made to FIG. 6, which is a functional block diagram showing such a stream encrypted communication system. On the transmission side in FIG. 6, the reference symbol a denotes the input-output pseudo characteristics of the one dimensional mapping circuit 43 included in the second pseudorandom number generator 41, while the reference symbol b denotes the input-output characteristics of the one dimensional mapping circuit 51 included in the same generator 41. On the receiving side in FIG. 6, the reference symbol c denotes the input-output characteristics of the one dimensional mapping circuit 43 included in the second pseudorandom number generator 41, while the reference symbol d denotes the input-output characteristics of the one dimensional mapping circuit 51 included in the same generator 41.

With regard to terminology, the term stream code refers to a coding system for scrambling, using a time series that is artificially produced and treating a digital file as a time series, this term being used in contraposition to the term block code. The artificially generated time series will be referred to as the PN (pseudorandom number) signal. The term stream encrypted communication system refers to a coded communication system in which, on the transmitting side a stream encrypting system is used to encrypt a plain text, which is then transmitted to a receiving destination, and decoded on the receiving side to obtain the original plain text.

Figure 6:
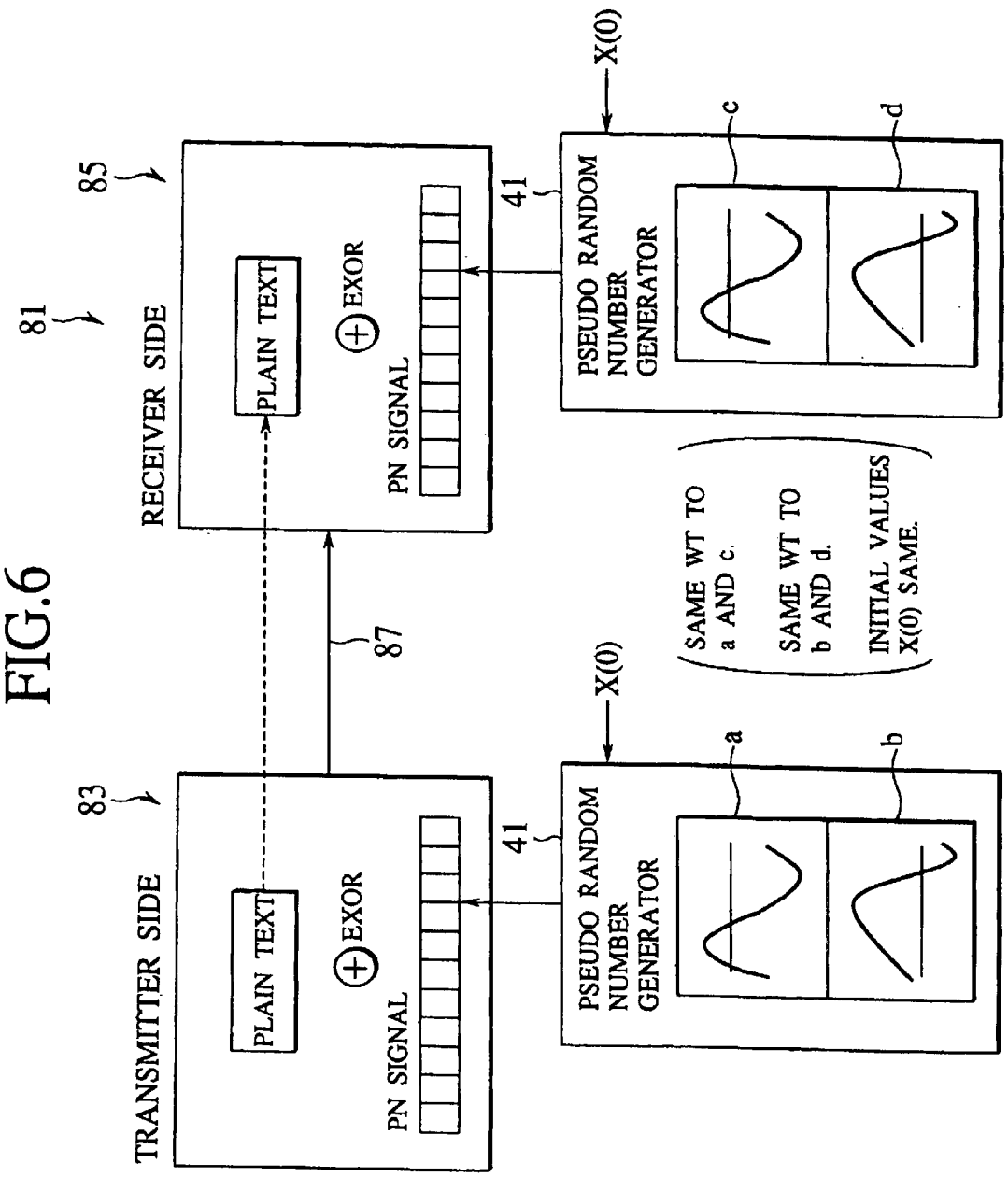
FIG. 6 is a functional block diagram showing a stream encrypted communication system.

A stream encrypted communication system 81, as shown in FIG. 6, includes a transmitting-side apparatus 83, a receiving-side apparatus, and a communication line 87, such as a common carrier telephone network connected so as to enable mutual exchange of data between the transmitting-side and receiving-side apparatuses 83 and 85.

Each of the apparatuses 83 and 85 includes an internal second pseudorandom number generator 41 or is connected thereto, pseudorandom numbers (a PN signal) generated by the pseudorandom number generators 41 being sent to each of the apparatuses 83 and 85.

The stream encrypted communication system 81 operates as follows. First, on the transmitting side, a plain text is encrypted into an encrypted text using a stream encrypting system. This encrypting is achieved by taking the exclusive-OR of the binary stream (PN signal) obtained by the pseudorandom number generator 41 and plain text code that includes the plain text code to be encrypted. The encrypted text obtained in this manner is transmitted to the receiving destination. According to this stream encryption method, it is possible to obtain an encrypted text with an optimum and high degree of security for use, for example, in communications.

At the receiving side, the encrypted text is decrypted to obtain the original plain text. The decryption is performed by taking the exclusive-OR of the binary stream (PN signal) obtained by the second pseudorandom number generator 41 and the encrypted text.

A required condition for enabling the above-described encrypted text to be decrypted with synchronization between the two apparatuses is that the binary stream (PN signal) for encryption be the same as the binary stream (PN signal) used for decryption. This is inherent in the property of the exclusive-OR that makes it possible to decrypt an encrypted text by taking the exclusive-OR of the encrypted text using the same PN signal as was used at the transmitting side to obtain the encrypted text by taking the exclusive-OR between the PN signal and the plain text to be encrypted. Stated differently, this required condition, as shown in FIG. 6, is equivalent to saying that, of the constitutional elements included in the pseudorandom number generator 41 that supplies a binary stream (PN signal) to the two apparatuses 83 and 85, the input-output characteristics of at least the one dimensional mapping circuits corresponding to one another must be in common (that is, the same weighting given to a and c and the same weighting given to b and d in FIG. 6), and also that the same initial value x(0) be given to both pseudorandom number generators 41. Once these conditions are met, the required information can be accurately transmitted. Thus, if stream encrypted communication is done using the encrypted text obtained by the above-noted encrypting system, it is possible to implement a stream encrypted communication system having an extremely high level of security.

It will be understood that the above-described embodiments are merely presented as examples for the purpose of facilitating an understanding of the present invention, and in no way are to be interpreted as restricting the technical scope of the present invention, meaning that the present invention of course includes all the embodiments thereof, and any equivalent embodiment.

More specifically, for example, while in the above-described embodiments the second pseudorandom number generator 41 was described using an exemplary application to a stream encrypted communication system, the present invention is not restricted in this manner, and can be embodied as well by applying the first pseudorandom number generator 11 to a stream encrypted communication system.

According to the present invention, described above in detail and recited as the first aspect, a non-linear quantizer is inserted in a chaos-generating loop for analog mapping by a one dimensional mapping circuit, thereby enabling the provision of a pseudorandom number generator that is capable of repeated extraction of the same binary stream $\{Y(t)-t\}$.

According to the present invention as recited in the second aspect, by imparting linear quantizing divisions to an AD converter and non-linear quantizing divisions to a DA converter, it is possible to broaden the dynamic range of a one dimensional mapping circuit.

According to the present invention as recited in the third aspect, it is possible to implement the pseudorandom number generator of the present invention with a CMOS integrated circuit, and to provide a novel technology for replacing the known feedback shift register circuit.

According to the present invention as recited in the fourth aspect, it is possible for the pseudorandom number generator of the present invention to output not only a binary stream $\{Y(t)-t\}$, but also an integer series signal $\{y(t)-t\}$ having a period of $2^n$, where n is the resolution, and because all combinations of integer series are guaranteed, it is possible to contribute to the improvement in calculating power of a digital computer. Additionally, because solution to a travelling salesman problem (TSP) is assured, it is possible to provide a basic technology applicable not only to communications, but also to advancements in computers.

According to the present invention as recited in the fifth aspect, because repeated alternate mapping is done by a pair of one dimensional mapping circuits and the analog outputs obtained thereby are cross-connected as feedback, it is possible, along with the divergence and convergence of the analog output produced by the pair of one dimensional mapping circuits, and the initial value sensitivity that is characteristic of chaos, to impart fine disturbances to the occurrence balance of 0 and 1 values of the binary stream that is obtained. These characteristic variations of chaos contribute to the robustness of the chaos code.

According to the present invention as recited in the sixth aspect, because initial value sensitivity is given via a DA converter, between a pair of binary streams having the same initial value as a starting point, regardless of how the streams are phase shifted and overlapped, there is no coincidence therebetween, and it is possible to achieve a time series with a sufficiently low auto-correlation and cross-correlation function.

According to the present invention as recited in the seventh aspect, as a result of being able to externally adjust the input-output characteristics of a one dimensional mapping circuit, it is possible to further increase the number of different chaos streams that can be extracted.

According to the present invention as recited in the eighth aspect, it is possible to provide a stream encryption method that can generate an encrypted code with an optimum and extremely high level of security for use in, for example, communications.

According to the present invention as recited in the ninth aspect, it is possible to achieve stream encrypted communication with an extremely high degree of security. More specifically, it is possible to implement an asynchronous multiple user stream encrypted communication system in which a user possessing the same pseudorandom number generator as was used in encrypting can achieve synchronous playback, expansion, mixing, and transfer of the encrypted text.

While the present invention has been described using specific terms, such description is for illustrative purposes, and it is to be understood that changes and variations may be made without departing from the spirit or scope of the following claims.

What is claimed is:

1. A pseudorandom number generator comprising:
   a one dimensional mapping circuit for generating chaos having non-linear input-output characteristics;
   an AD converter for converting an analog output of the one dimensional mapping circuit;
   a sample-and-hold circuit for holding and outputting a digitally converted value from the AD converter in response to an external clock; and
   a DA converter for outputting an analog converted value in response to the output of the sample-and-hold circuit as feedback to the one dimensional mapping circuit,
   wherein quantizing divisions of at least one of the AD converter and the DA converter are made non-linear, and further wherein a binary stream is output responsive to the output of the sample-and-hold circuit.

2. A pseudorandom number generator according to claim 1, wherein quantizing divisions of the AD converter are linear and quantizing divisions of the DA converter are non-linear.

3. A pseudorandom number generator according to claim 1, wherein;
   the one dimensional mapping circuit is implemented by a CMOS inverter,
   the AD convener is configured so as to include an AD weighting resistive array and a comparator array that compares the relative size of an output obtained from a synthesized resistance of the AD weighting resistive array and the analog output from the one dimensional mapping circuit,
   the sample-and-hold circuit is implemented as a flip-flop array that captures and holds the digital output of the AD converter in response to an external clock, and wherein
   the DA converter is configured so as to include a DA weighting resistive array, and a switching array that outputs an output obtained from the synthesized resistance of the DA weighting resistive array in response to the digital output from the sample-and-hold circuit as feedback to the one dimensional mapping circuit.

4. A pseudorandom number generator according to claim 3, wherein an exclusive-OR array is inserted which takes the exclusive-OR of the outputs of each comparator making up the comparator array is provided between the AD converter and the sample-and-hold circuit.

5. A pseudorandom number generator comprising:
   a chaos-generating loop comprising a pair of one dimensional mapping circuits for generating chaos having non-linear input-output characteristics, a pair of CMOS switches which alternately open and close an output side path of the one dimensional mapping circuits, in synchronization with an external clock, and a pair of feedback loops that cross-connect the analog outputs of each of the one dimensional mapping circuits, via the CMOS switches, as feedback to the inputs of the other of the one dimensional mapping circuits; and
   a pair of AD converters that perform digital conversion of the analog outputs of the one dimensional mapping circuits that are extracted via the CMOS switches,
   wherein in the chaos-generating loop, according to the elapse of the discrete time established by an external clock, the outputs of the one dimensional mapping circuits are alternately mapped, so as to output, via each of the AD converters, a binary sequence that is a chaos stream.

6. A pseudorandom number generator according to claim 5, further comprising:
   a DA converter that performs an analog conversion of an initial value given in the form of a digital signal; and
   a CMOS switch performing opening and closing of an output side path of the DA converter, synchronized to an external clock.

7. A pseudorandom number generator according to claim 5, wherein at least one of the pair of one dimensional mapping circuits has input-output characteristics that can be individually adjusted by means of an external adjustment voltage.

8. A method for stream encryption, whereby a binary stream generated by a pseudorandom number generator according to claim 1 is used to perform stream encryption, thereby obtaining an encrypted text code, whereby the stream encryption is achieved by an exclusive-OR operation performed between a binary stream obtained from the pseudorandom number generator and the plain text to be encrypted.

9. A stream encrypted communications method that uses an encrypted text obtained by the stream encryption method according to claim 8.

10. A method for stream encryption, whereby a binary stream generated by a pseudorandom number generator according to claim 5 is used to perform stream encryption, thereby obtaining an encrypted text code, whereby the stream encryption is achieved by an exclusive-OR operation performed between a binary stream obtained from the pseudorandom number generator and the plain text to be encrypted.

11. A stream encrypted communications method that uses an encrypted text obtained by the stream encryption method according to claim 10.

* * * * *

UNITED STATES PATENT AND TRADEMARK OFFICE
CERTIFICATE OF CORRECTION

PATENT NO. : 6,788,787 B1
DATED : September 7, 2004
INVENTOR(S) : Katsufusa Shono et al.

It is certified that error appears in the above-identified patent and that said Letters Patent is hereby corrected as shown below:

Column 15,
Line 46, "convener" should read -- converter --.

Signed and Sealed this

Twenty-second Day of March, 2005

JON W. DUDAS
*Director of the United States Patent and Trademark Office*